US00RE34130E

United States Patent [19]

Berfield et al.

[11] E Patent Number: Re. 34,130

[45] Reissued Date of Patent: Nov. 24, 1992

[54] DOLLY FRAME

[75] Inventors: Robert C. Berfield, Jersey Shore; Craig A. Seasholtz, Avis, both of Pa.

[73] Assignee: Shop-Vac Corporation, Williamsport, Pa.

[21] Appl. No.: 645,580

[22] Filed: Jan. 24, 1991

Related U.S. Patent Documents

Reissue of:

[64] Patent No.: 4,799,699
Issued: Jan. 24, 1989
Appl. No.: 47,202
Filed: May 6, 1987

[51] Int. Cl.[5] ..... B62B 5/00

[52] U.S. Cl. ..... 280/79.5; 248/129; 248/298; 248/310; 280/79.2

[58] Field of Search ..... 280/79.1, 79.2, 79.5, 280/47.131, 47.26; 248/129, 298, 310, 346

[56] References Cited

U.S. PATENT DOCUMENTS

| | | | |
|---|---|---|---|
| D. 27,784 | 10/1897 | Gander | 280/79.1 |
| 422,729 | 3/1890 | Clark | 248/129 |
| 2,772,889 | 12/1956 | Reynolds . | |
| 2,818,271 | 12/1957 | Saeli | 280/79.2 |
| 3,463,505 | 8/1969 | German et al. | 280/79.2 |
| 3,734,527 | 5/1973 | Bard . | |
| 3,837,666 | 9/1974 | Hodson | 280/47.13 R |
| 4,572,531 | 2/1986 | Elia | 280/79.1 |

FOREIGN PATENT DOCUMENTS

| | | | |
|---|---|---|---|
| 0209455 | 1/1987 | European Pat. Off. . | |
| 2749905 | 5/1979 | Fed. Rep. of Germany . | |
| 1584489 | 2/1981 | United Kingdom | 280/79.1 |

*Primary Examiner*—Charles A. Marmor
*Assistant Examiner*—Michael Mar
*Attorney, Agent, or Firm*—Marshall, O'Toole, Gerstein, Murray & Bicknell

[57] ABSTRACT

A dolly for supporting a tank standing on end is provided with a T-shaped plastic base formed by a crossarm and a leg that are joined by an adjustable interlocking connection. Both ends of the crossarm and the end of the leg remote from the crossarm are provided with arcuate grooves that receive the bead surrounding the bottom of the tank. The heads of fastening screws extend over the grooves to retain the bead therein. A metal axle rod extends through a longitudinal passage in the crossarm. This passage has an open top in the region between the grooves in the crossarm so that a tank on the base engages the rod to be supported directly thereby.

22 Claims, 6 Drawing Sheets

FIG. 1.
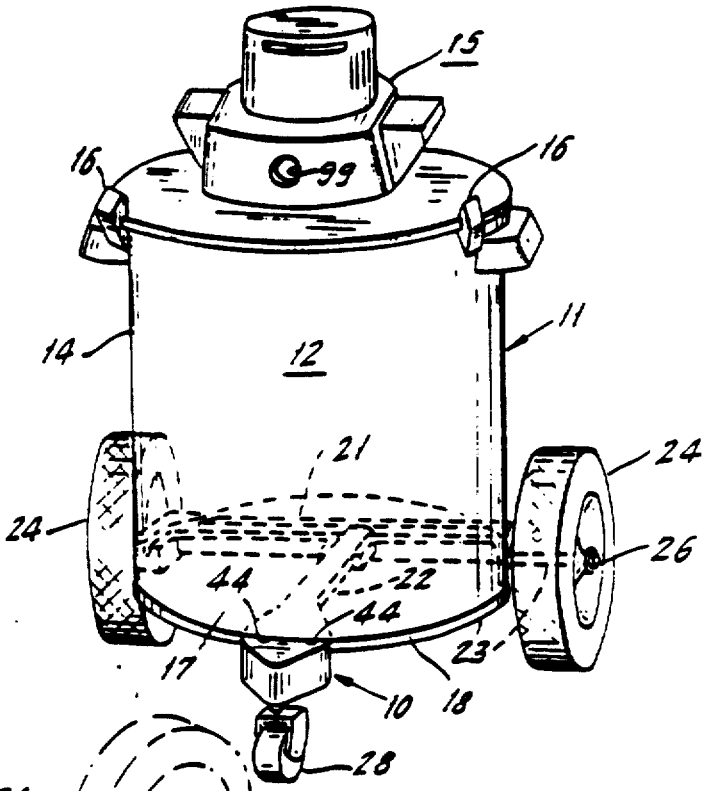
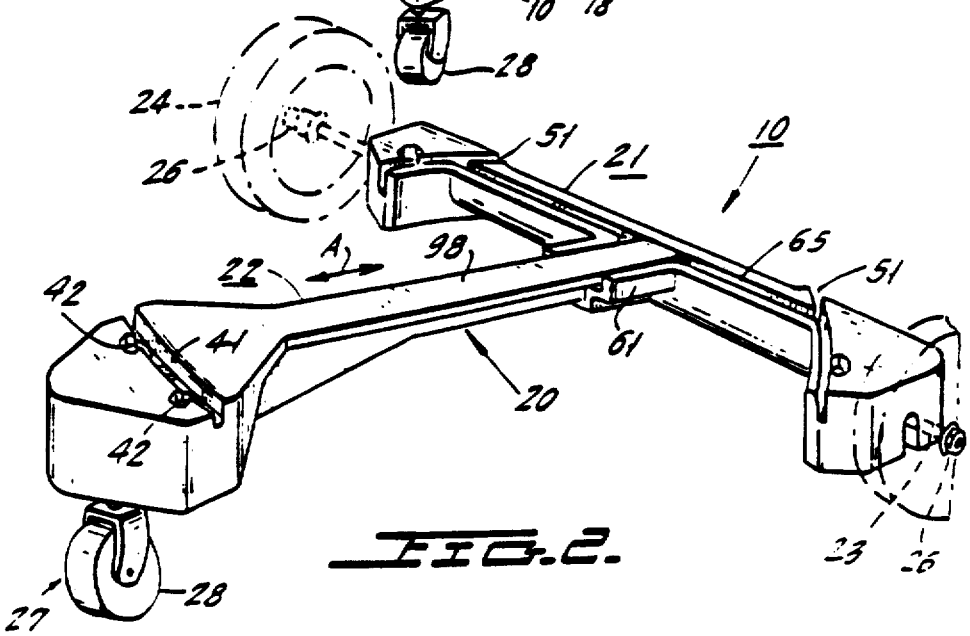
FIG. 2.

FIG. 3.
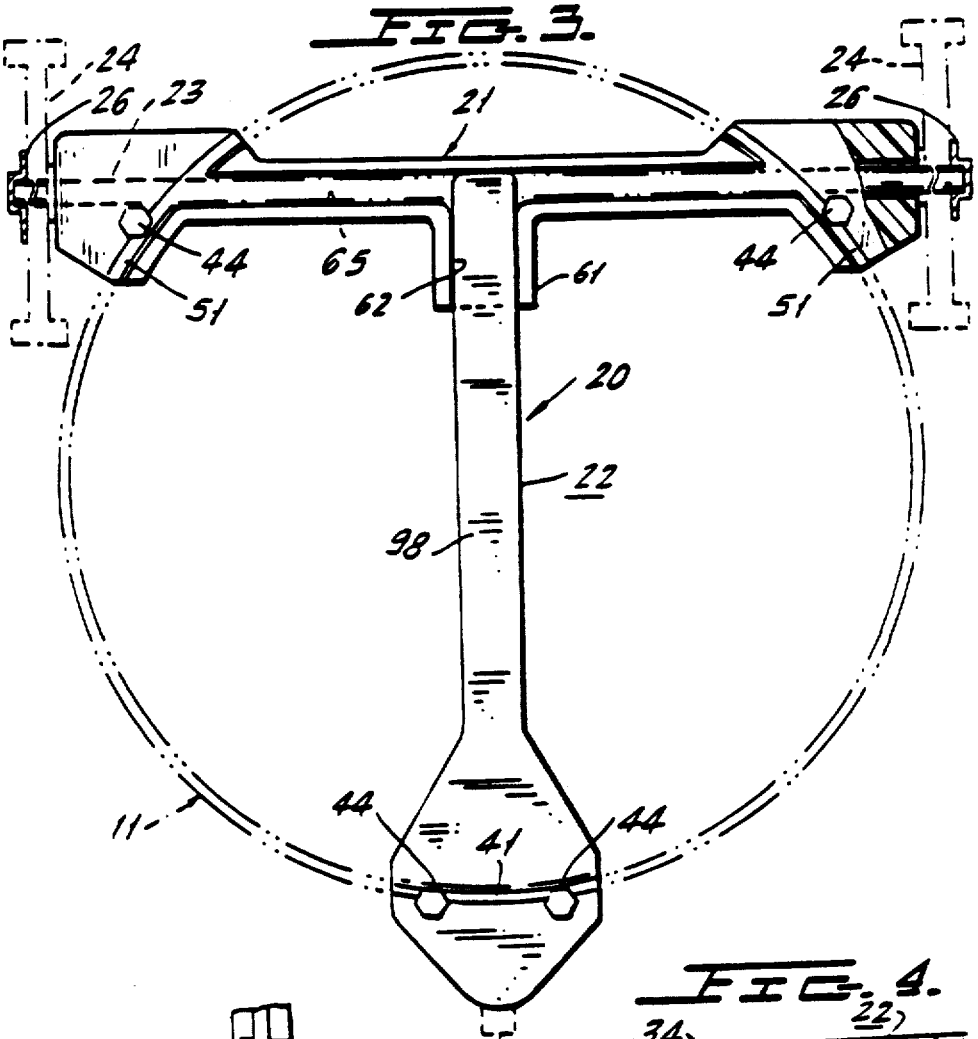
FIG. 4.
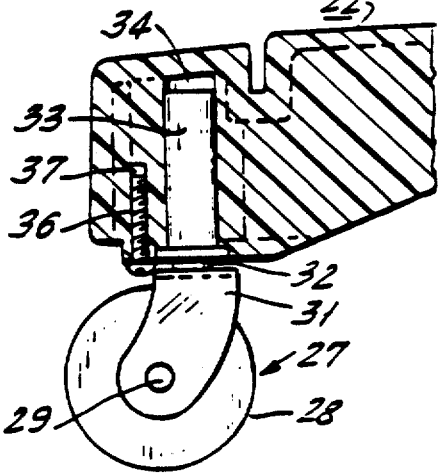
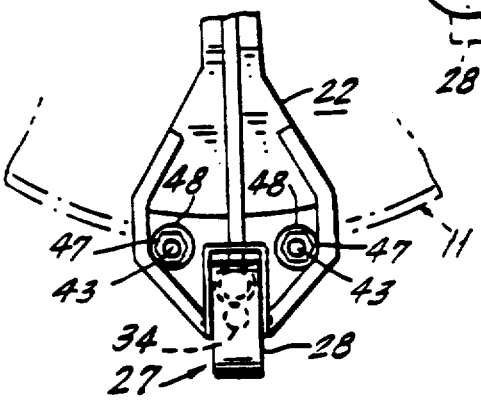
FIG. 5.

20
41
22
38
98
11
13
42
46
34
37
10

DOLLY FRAME

Matter enclosed in heavy brackets [ ] appears in the original patent but forms no part of this reissue specification; matter printed in italics indicates the additions made by reissue.

BACKGROUND OF THE INVENTION

This invention relates to dollies in general, and more particularly relates to the frame of a dolly that is secured to the bottom of a barrel or tank which is standing on end.

There are many mobile devices that include barrels or tanks positioned standing on end. Typical of such devices are so-called bypass type vacuum cleaners where a suction-producing fan means is removably mounted to the top of a tank wherein dirt, including liquid, is collected. These tanks are mounted on dollies that are usually provided with means for securing the tanks to the dollies.

Many prior art dollies of this type include a base that is constructed of relatively expensive elements or there are many elements that are costly to assemble, and there is very little flexibility insofar as being able to use a particular dolly for many tanks that fall within a reasonably large acceptable range of dimensional variation. An example of a prior art dolly of this type is found in copending U.S. patent application Ser. No. 803,254, filed Dec. 2, 1985 in the name of R. C. Berfield, R. L. Crevling, Jr. and D. G. Rightnour, and titled DOLLY WITH TANK HOLDING DEVICE. The dolly of application Ser. No. 803,254 is provided with a frame constructed of formed and stamped metal elements to which separate brackets for mounting swivel-type wheel units are secured.

SUMMARY OF THE INVENTION

In accordance with the instant invention, a dolly is constructed with a base consisting of two elongated plastic elements that are interengaged in a T-configuration, with one element constituting the crossarm and the other element constituting a leg which extends from the center of the crossarm and at right angles thereto. The connection between the leg and crossarm permits limited adjustment between these elements so that the drum diameter need not have a close tolerance. A metal rod constituting an axle extends lengthwise through the crossarm and mounts wheels at opposite ends thereof. At the end of the leg remote from the crossarm there is a well that receives the stem of a swivel-type wheel unit. The front or top of the base is provided with three slots, two being at opposite enlarged ends of the crossarm and the third being at the enlarged end of the leg remote from the crossarm. These slots receive the peripheral bead at the bottom of the drum, which bead is held in the slots by screws that are mounted to the base, with portions of the screw heads overlapping the bead.

Accordingly, the primary object of the instant invention is to provide an inexpensive dolly that is readily securable to a drum which is standing on end.

Another object is to provide a dolly of this type that includes a load carrying base constructed of interengaging plastic elements.

Still another object is to provide a dolly of this type in which there is a wheel axle that extends longitudinally through one of the plastic elements and is disposed for direct support of the drum.

A further object is to provide a dolly of this type in which the base is provided with an integrally formed well that receives the stem of a swivel-type wheel unit.

A still further object is to provide a dolly of this type that is adjustable for use with drums of different diameters that fall within a reasonably large range of dimensional variation.

BRIEF DESCRIPTION OF THE DRAWINGS

The foregoing objects, as well as other objects of this invention will become readily apparent reading the following description of the accompanying drawings in which:

FIG. 1 is a perspective of a vacuum cleaner mounted on a dolly constructed in accordance with teachings of the instant invention;

FIG. 2 is a perspective of the dolly of FIG. 1;

FIG. 3 is a top or front view of the dolly base;

FIG. 4 is a fragmentary cross-section illustrating a swivel-type wheel unit mounted to the base;

FIG. 5 is a fragmentary rear or back view of the base in FIG. 4;

DETAILED DESCRIPTION OF THE PREFERRED EMBODIMENT

Figure 8:
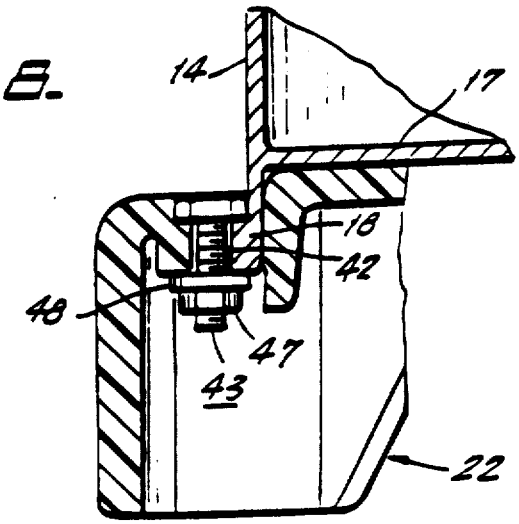
FIG. 8 is a partial cross-section illustrating securement of the vacuum cleaner drum to the enlarged end of the base leg.
Figure 7:
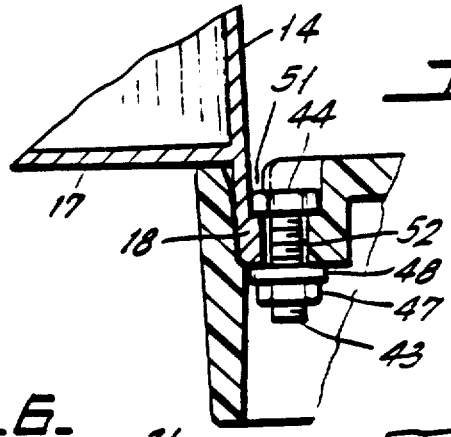
FIG. 7 is a partial cross-section illustrating securement of the vacuum cleaner drum to one enlarged end of the crossarm base.

Now referring to the drawings, in which FIG. 1 illustrates tank 12 of vacuum cleaner 11 mounted on dolly 10 which is constructed in accordance with teachings of the instant invention. In a manner known to the art, tank 12 is provided with cylindrical side wall 14. Motor-blower assembly 15, removably held in operative position by a plurality of manually operable latches 16, normally closes the upper end of the tank 12. The lower end of tank 12 is closed by recessed disc 17, having a reversely curled peripheral edge that constitutes bead 18 which surrounds side wall 14 at the bottom edge thereof. Dolly 10 includes generally T-shaped base 20 formed through the cooperation of crossarm 21 and leg 22. The latter extends from the center of crossarm 21 and at right angles thereto. Both elements 21 and 22 are constructed of a relatively hard, rugged plastic such as foamed high density polyethylene.

Metal rod 23 extends longitudinally through crossarm 21 and constitutes a fixed axle for relatively large wheels 24, 24 that are mounted to opposite ends of rod 23 just outboard of the enlarged ends of crossarm 21, with push-type cap nuts 26, 26 retaining wheels 24, 24 mounted on axle 23. Swivel-type wheel unit 27 is mounted to leg 22 at the enlarged end thereof disposed remote from crossarm 21. Wheel unit 27 includes wheel 28 rotatably mounted on horizontal pin 29 that extends between the arms of U-shaped bracket 31. Stem 32, constituting a swivel axis for unit 27, extends upward from the web of bracket 31 into plastic insert 33. The latter is disposed within recess or well 34 in the bottom of leg 22, being captured by the head of screw 36 (FIG. 4) that is threaded into leg recess 37 (FIG. 9).

Figure 6:
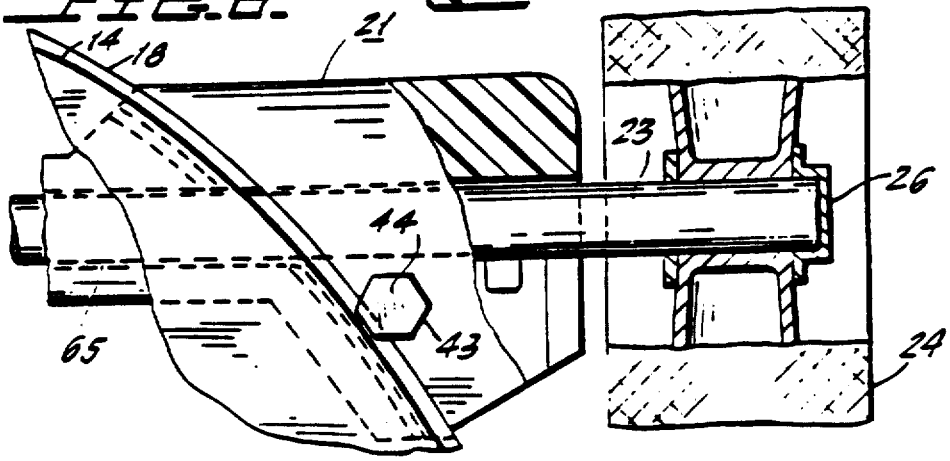
FIG. 6 is a fragmentary top view illustrating securement of the drum to the base at one enlarged end of the base crossarm.
Figures 9, 10, 11, 12, 13:
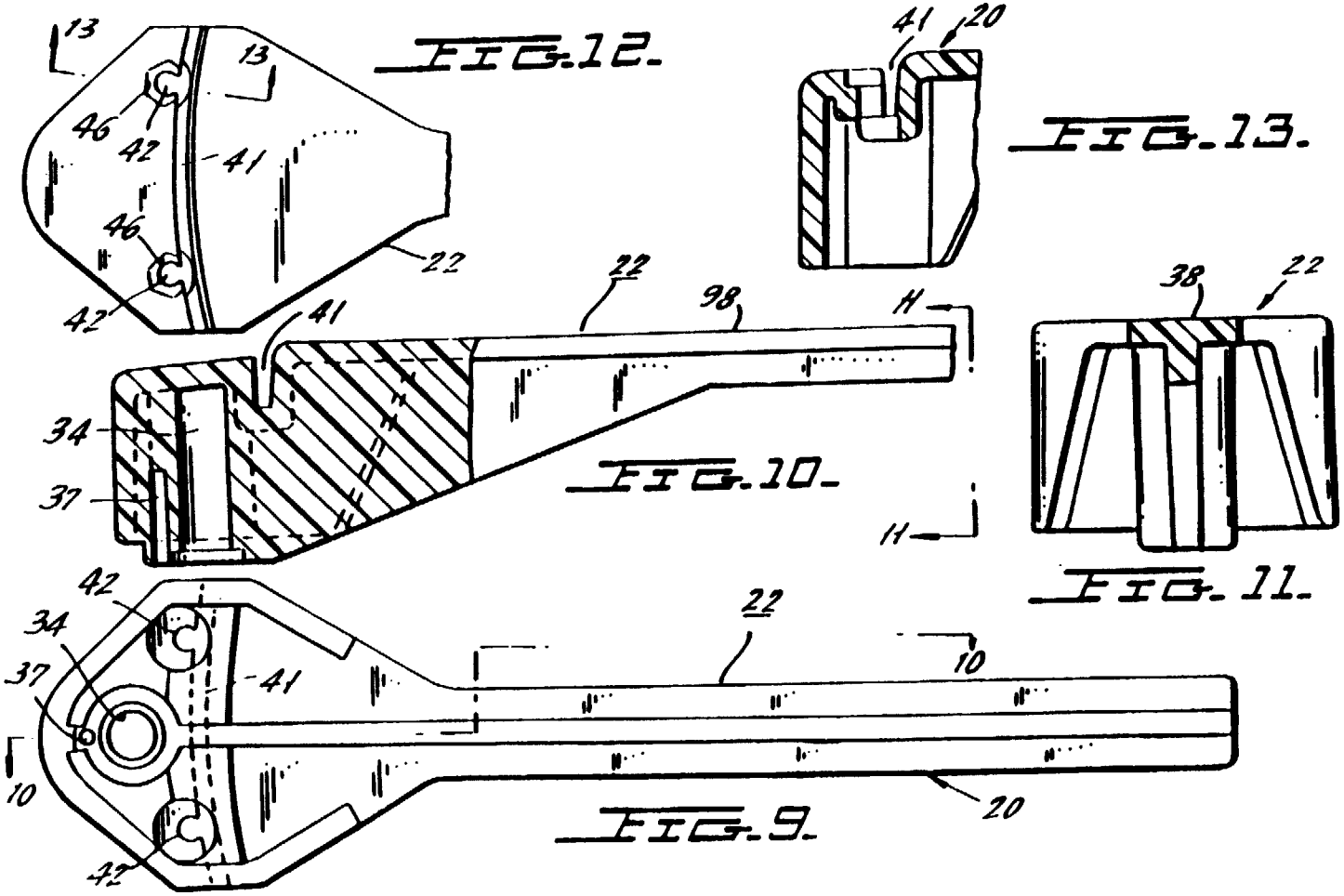
FIG. 9 is a rear elevation of the base leg.
FIG. 10 is a fragmentary portion of the base leg taken through section line 10—10 of FIG. 9, looking in the direction of arrows 10—10.
FIG. 11 is an elevation of the base leg, looking in the direction of arrows 11—11 of FIG. 10 toward the cutaway end of the base leg.
FIG. 12 is a front elevation of the base leg end remote from the base crossarm.
FIG. 13 is a partial section taken through line 13—13 of FIG. 12, looking in the direction of arrows 13—13.
Figure 14:
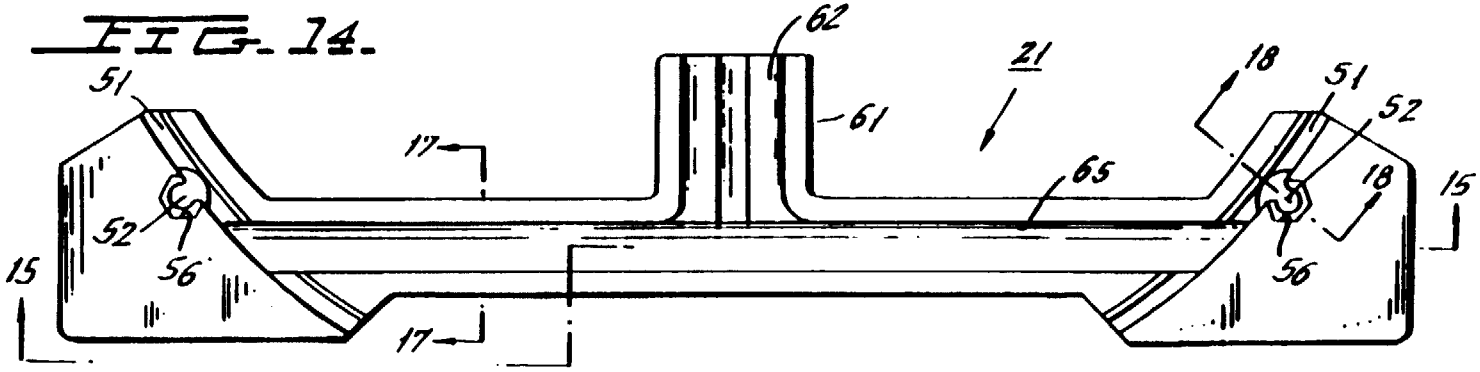
FIG. 14 is a top plan or front view of the crossarm.
Figure 16:
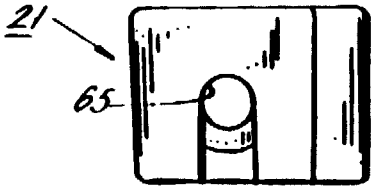
FIG. 16 is an end view of the crossarm, looking in the direction of arrows 16—16 of FIG. 15.
Figure 17:
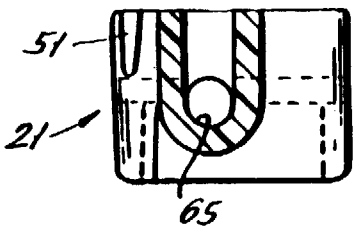
FIGS. 17 and 18 are partial cross-sections of the crossarm taken through the respective lines 17—17 and 18—18 of FIG. 14, looking in the direction of the respective arrows 17—17 and 18—18.
Figure 18:
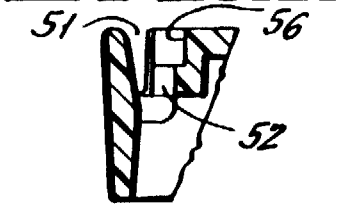
Figure 15:
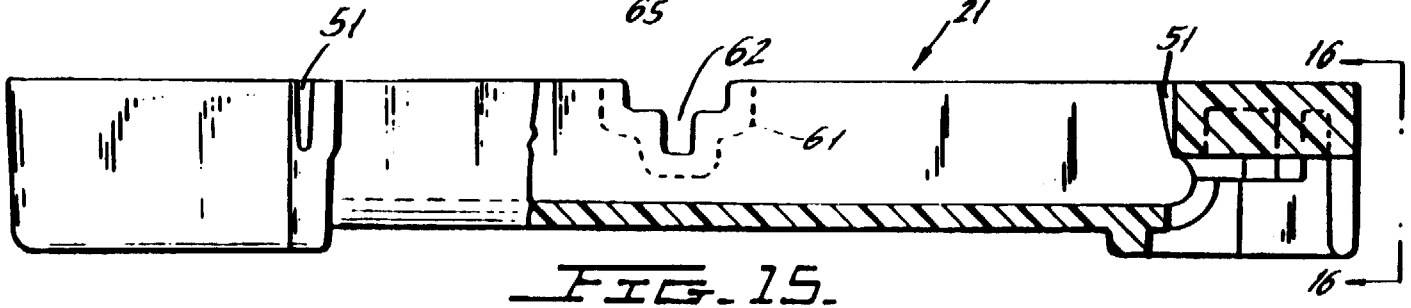
FIG. 15 is a partial longitudinal section of the crossarm taken through line 15—15 of FIG. 14, looking in the direction of arrows 15—15.
Figure 22:
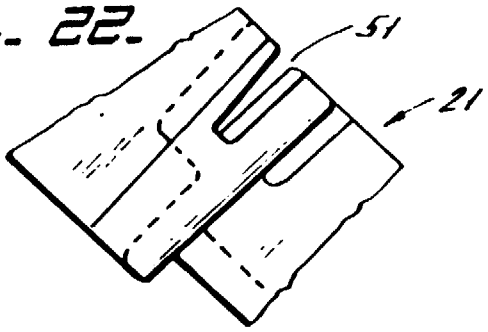
FIG. 22 is a fragmentary elevation of the crossarm looking in the direction of arrows 22—22 of FIG. 19.
Figure 20:
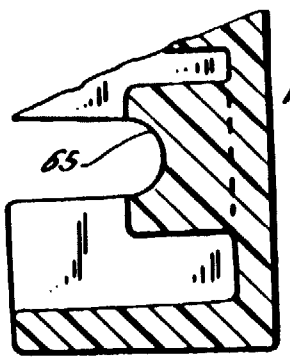
FIGS. 20 and 21 are cross-sections taken through the respective lines 20—20 and 21—21 of FIG. 19, looking in the directions of respective arrows 20—20 and 21—21.
Figure 21:
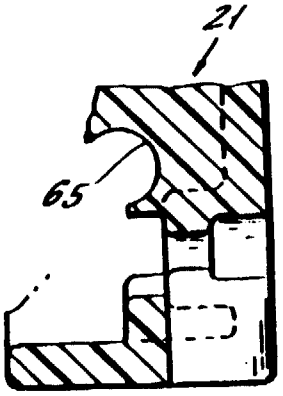
Figure 19:
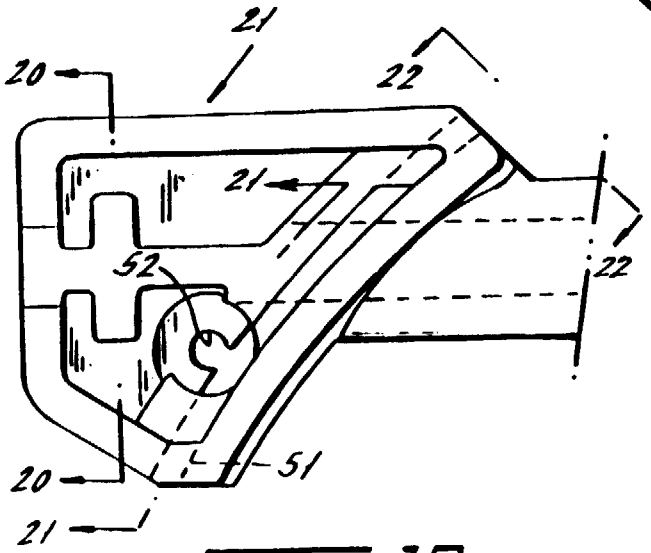
FIG. 19 is a bottom or rear view of one end of the crossarm.

With particular reference to FIGS. 9–13, it is seen that a major portion of leg 22 is of T-shaped cross-section, as indicated by hatched section 38 in FIG. 11. For a reason which will hereinafter be explained this T cross-section 38 extends to the end of leg 22 that is remote from wheel 28. The upper surface of leg 22 at the enlarged end thereof where wheel 28 is mounted, is provided with transverse arcuate groove 41 that receives bead 18 at the lower edge of tank 12. Spaced with respect to the length of groove 41 and disposed immediately to the outboard side thereof are two apertures 42, each of which receives a hex-head screw 43 (FIG. 6) entered through the top of hole 42. Screw head 44 is disposed within recess 46 which is shaped to prevent rotation of screw 43. A portion of head 44 engages bead 18 along the upper edge thereof to capture the latter within groove 41. Screw 43 is held in position by nut 47 that is threadedly mounted thereon at the rear of leg 22, with washer 48 being interposed between nut 47 and a bottom surface of leg 22. In a similar manner, tank 12 is secured to opposite enlarged ends of crossarm 21.

That is, the upper surface of crossarm 21 at each enlarged end thereof is provided with an arcuate groove 51 that is open at the top for the length thereof. Through aperture 52 is formed along the outboard edge of groove 51 to receive an additional holding screw 43. Head 44 of each additional screw 43 is received within a partially hexagonal depression 56 and overlies bead 18 to block the latter from leaving groove 51. Short transverse projection 61, at the center of base member 21, is provided with T-shaped depression 62 that complements T-shaped portion 38 of leg 22 (FIG. 13). The latter at its free end is entered into complementary 62 so as to permit base members 21 and 22 to slide relative to one another in a manner such that there is limited adjustment therebetween, as indicated by arrow A in FIG. 2. This adjustment enables dolly 10 to be fastened readily and securely to tanks 12 that fall within an acceptable relatively wide range of dimensional variation.

Crossarm 21 also includes longitudinal passage 65 which is open at the top thereof for the major portion of its length. This top opening to passage 65 extends from one groove 51 to the other groove 51. Each end portion of passage 65 outboard of grooves 51 is open at the bottom thereof. In this way axle rod 23 that extends through passage 65 is retained against transverse movement by crossarm 21. The lower portions of groove 51 communicate with passage 65 so that bead 18 at the lower edge of drum 12 rests directly against rod 23. This direct contact between axle 23 and the lower edge of bead 18 serves to protect the plastic elements of dolly 10 from severe impacts such as those occurring when descending stairs. Depression 62 communicates with passage 65 at the center thereof and permits T-shaped portion 38 of leg 22 to extend over axle rod 23.

Dolly 10 is mounted to tank 12 by locating leg 22 so that swivel unit 27 is under inlet 99 and then tightening nuts 47 on two screws 43 carried by leg 22. Thereafter, crossarm 21 is positioned by mating same with the end of leg 22 remote from wheel 28 and then securing the latter to drum 12 by tightening nuts 47 on the other two screws 43. The upper surface 98 of leg 22 is adjacent the recessed bottom surface provided by disc 17, and the end of leg 22 remote from wheel unit 27 is captured between drum closure disc 17 and crossarm 21.

Although the present invention has been described in connection with a preferred embodiment thereof, many variations and modifications will now become apparent to those skilled in the art. It is preferred, therefore that the present invention be limited not by the specific disclosure herein, but only by the appended claims.

What is claimed is:

1. A dolly for movably supporting a tank having a curved side-wall, a closed bottom and a downwardly disposed bead on the side-wall at the bottom thereof, said dolly including:

a base, wheel means on said base for positioning the latter so that it is generally horizontal, arcuate groove means formed within the top surface of said base for receiving the downwardly disposed bead of said tank and fastening means for [maintaining] *releasably securing* said downwardly disposed bead [within said base] *to said groove means* thereby securing said tank to said base, *said fastening means including a screw extending through an aperture in said base disposed adjacent said groove means in operative association therewith; said screw being entered into said aperture through its open top and having a head portion that partially overlaps said groove means in association therewith to block upward movement of said sidewall bead disposed within said groove means;* said base being constructed of [synthetic] elements connected in a generally T-shaped configuration;

a first of said elements constituting a crossarm and a second of said elements constituting a leg extending from one side of the crossarm at right angles thereto and generally at the center thereof;

said crossarm and said leg being engaged at an adjustable connection that permits limited movement therebetween in a direction longitudinally of said leg.

2. A dolly as set forth in claim 1, in which a first wheel of said wheel means is disposed at a first end of said leg remote from said crossarm, and second and third wheels of said wheel means are disposed at opposite ends of said crossarm.

3. A dolly as set forth in claim 2, in which there is a metal rod extending through a longitudinal passage in said crossarm and extending beyond opposite ends thereof, said second and third wheels being mounted to opposite ends of said rod.

4. A dolly as set forth in claim 3, in which said passage is open at its top for a substantial portion of its length to expose said rod for direct engagement by a tank supported on said base.

5. A dolly as set forth in claim 3, in which said first wheel constitutes part of a swivel type wheel unit that also includes a post that constitutes a swivel axis; said first end of said leg having a well formed integrally therewith; said post being disposed within said well.

6. A dolly as set forth in claim 2, in which said groove means includes a first groove in a first end of said leg and second and third grooves in the opposite ends of said crossarm; each of said grooves being arcuate and having an open top along its length to receive portions of said sidewall bead; said fastening means partially overlapping said grooves and positioned above said sidewall bead disposed in said grooves in blocking relationship with respect to such bead.

7. A dolly as set forth in claim 6, in which there is a metal rod extending through a longitudinal passage in said crossarm and extending beyond opposite ends thereof, said second and third wheels being mounted to opposite ends of said rod.

8. A dolly as set forth in claim 7, in which said passage is open at its top for a midregion thereof extending from said second groove to said third groove.

9. A dolly as set forth in claim 8, in which said passage is closed at its top outboard of said second and third grooves.

10. A dolly as set forth in claim 9, in which said passage is open at its bottom outboard of said second and third grooves.

[11. A dolly as set forth in claim 6, in which the fastening means includes a screw extending through an aperture in said base disposed adjacent each of said grooves in operative association therewith; each of said screws being entered into said aperture through its open top and having a head portion that partially overlaps said groove in association therewith to block upward movement of said sidewall bead disposed within said groove.]

12. A dolly as set forth in claim [11] *1*, in which there [is] *are a plurality of said screws and* an individual tightening nut mounted on each of said screws; said nuts being accessible for operation at the bottom of said base.

13. A dolly as set forth in claim 6, in which said leg is of enlarged cross-section at said first end and said crossarm is enlarged at both of its ends.

14. A dolly as set forth in claim 1, in which the adjustable connection is formed by first and second sections having complementary cross-sections; said first section being on said leg at its second end; said second section being on said crossarms at a central region thereof.

15. A dolly as set forth in claim 14, in which the *second* section is disposed below the first section.

16. A dolly as set forth in claim 15, in which the first section is a T-shaped cross-section having a downwardly extending leg; said second section defining a recess wherein said first section is disposed.

17. A dolly [as set forth in claim 16, in which] *for movably supporting a tank having a curved side-wall, a closed bottom and a downwardly disposed bead on the side-wall at the bottom thereof, said bead including:*

*a base, wheel means on said base for positioning the latter so that it is generally horizontal, arcuate groove means formed within the top surface of said base for receiving the downwardly disposed bead of said tank and fastening means for releasably securing said downwardly disposed bead to said groove means thereby securing said tank to said base;*

*said base being constructed of elements connected in a generally T-shaped configuration;*

*a first of said elements constituting a crossarm and a second of said elements constituting a leg extending from one side of the crossarm at right angles thereto and generally at the center thereof, said leg having first and second ends;*

*said crossarm and said leg being engaged at an adjustable connection that permits limited movement therebetween in a direction longitudinally of said leg, the adjustable connection being formed by first and second sections having complementary cross sections; said first section being on said leg at its second end; said second section being on said crossarm at a central region thereof, the second section being disposed below the first section, the first section being of T-shaped cross section having a downwardly extending leg, said second section defining a recess wherein said first section is disposed, and further wherein* there is a metal rod extending through a longitudinal passage in said crossarm and extending [beyond] *between* opposite ends thereof, said second and third wheels being mounted to opposite ends of said rod; said passage being open at its top for a substantial portion of its length to expose said rod for direct engagement by a tank supported on said base; said recess defined by said second section communicating with said passage; said first section extending over said rod.

18. A dolly [as set forth in claim 14 in which] *for movably supporting a tank having a curved side-wall, a closed bottom and a downwardly disposed bead on the side-wall at the bottom thereof, said dolly including:*

*a base, wheel means on said base for positioning the latter so that it is generally horizontal, arcuate groove means formed within the top surface of said base for receiving the downwardly disposed bead of said tank and fastening means for releasably securing said downwardly disposed bead to said groove means thereby securing said tank to said base;*

*said base being constructed of elements connected in a generally T-shaped configuration;*

*a first of said elements constituting a crossarm and a second of said elements constituting a leg extending from one side of the crossarm at right angles thereto and generally at the center thereof, said leg having first and second ends:*

*said crossarm and said leg being engaged at an adjustable connection that permits limited movement therebetween in a direction longitudinally of said leg;*

*the adjustable connection being formed by first and second sections having complementary cross sections, said first section being on said leg at its second end, said second section being on said crossarm at a central region thereof,* the second section [defines] *defining* a recess wherein said first section is disposed;

a metal rod extending through a longitudinal passage in said crossarm and extending beyond opposite ends thereof, said second and third wheels being mounted to opposite ends of said rod;

said passage being open at its top for a substantial portion of its length to expose said rod for direct engagement by a tank supported on said base;

said recess defined by said second section communicating with said passage at the center of said passage.

19. A dolly for movably supporting a tank having a curved side-wall, a closed bottom and [an outwardly] *a downwardly* disposed bead on the side-wall at the bottom thereof, said dolly including:

*a base, wheel means on said base for positioning the latter so that it is generally horizontal, arcuate groove means formed within the top surface of said base for receiving the downwardly disposed bead of said tank* and fastening [below, secured] *means for releasably securing said downwardly disposed bead to said groove means thereby securing said tank* to said base;

said base being constructed of [synthetic] elements connected in a generally T-shaped configuration;

a first of said elements constituting a crossarm and a second of said elements constituting a leg that extends at right angles to the crossarm generally at the center thereof;

a first wheel of said wheel means being disposed at a first end of said leg remote from said crossarm, and second and third wheels of said wheel means being disposed at opposite ends of said crossarm;

a metal rod extending through a longitudinal passage on said crossarm and extending beyond opposite ends thereof, said second and third wheels being mounted to opposite ends of said rod;

said passage being open at its top for a substantial portion of its length to expose said rod for direct engagement by a tank supported on said base.

*20. A dolly as set forth in claim 1, in which said base is constructed of synthetic elements.*

*21. A dolly as set forth in claim 20, in which said synthetic elements are plastic.*

*22. A dolly as set forth in claim 19, in which said base is constructed of synthetic elements.*

*23. A dolly as set forth in claim 22, in which said synthetic elements are plastic.*

* * * * *